(No Model.) 2 Sheets—Sheet 1.
W. D. LINDSLEY.
SEEDING ATTACHMENT FOR PLOWS.
No. 406,360. Patented July 2, 1889.
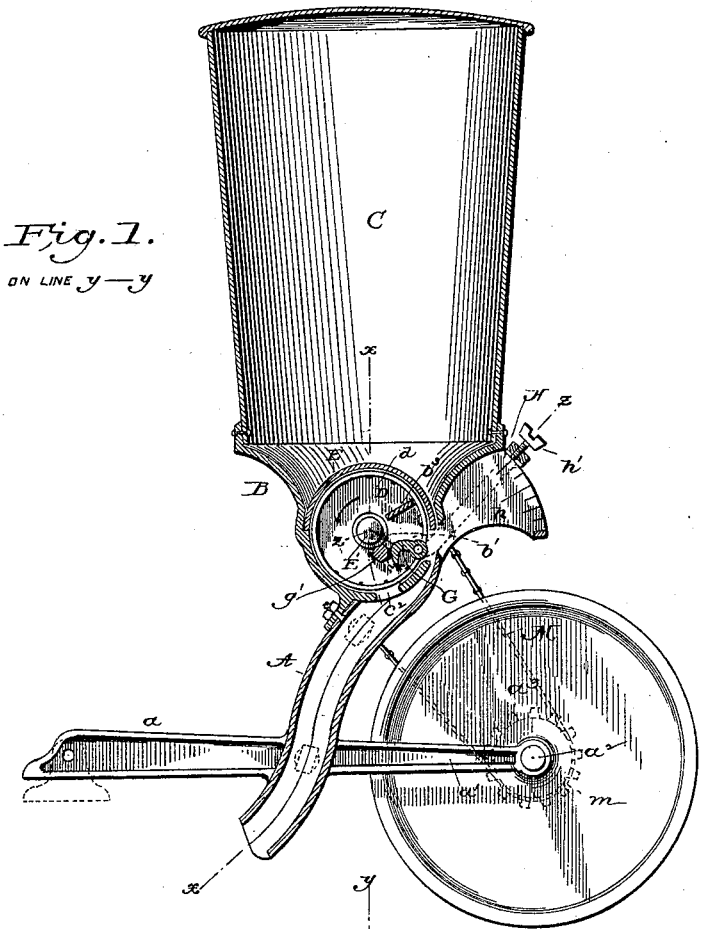
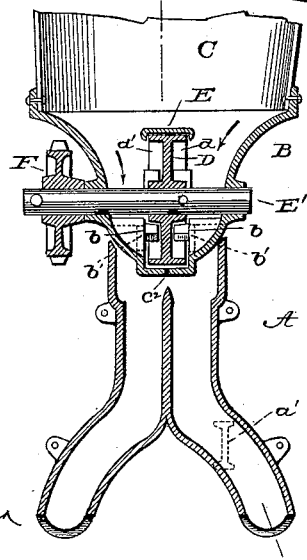

(No Model.) 2 Sheets—Sheet 2.

W. D. LINDSLEY.
SEEDING ATTACHMENT FOR PLOWS.

No. 406,360. Patented July 2, 1889.

ON LINE Z—Z

ON LINE S—S

Witnesses
Inventor
W. D. Lindsley
By Phil T. Dodge
Attorney

UNITED STATES PATENT OFFICE.

WILLIAM D. LINDSLEY, OF HUNTSVILLE, KANSAS.

SEEDING ATTACHMENT FOR PLOWS.

SPECIFICATION forming part of Letters Patent No. 406,360, dated July 2, 1889.

Application filed March 11, 1889. Serial No. 302,753. (No model.)

*To all whom it may concern:*

Be it known that I, WILLIAM D. LINDSLEY, of Huntsville, in the county of Reno and State of Kansas, have invented certain Improvements in Seeding Attachments for Plows, of which the following is a specification.

This invention relates to an attachment for mold-board plows intended to drill two rows of wheat or other seed.

The invention relates, first, to the construction of the seed-distributing mechanism, and, second, to adjustable clamping devices for connecting the same with the plow.

Figure 3:
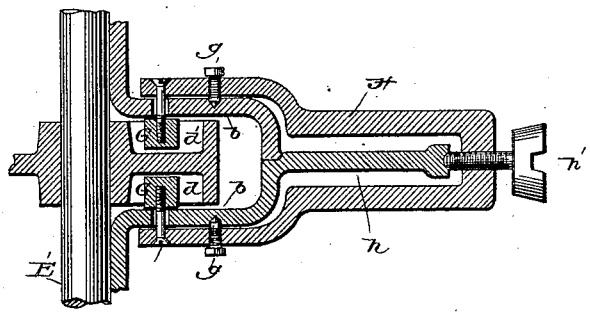
Figure 4:
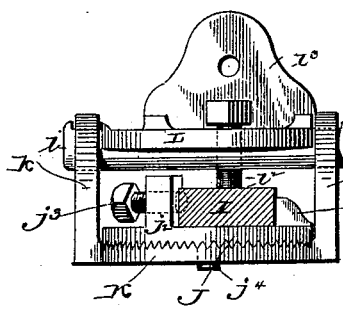
Figure 5:
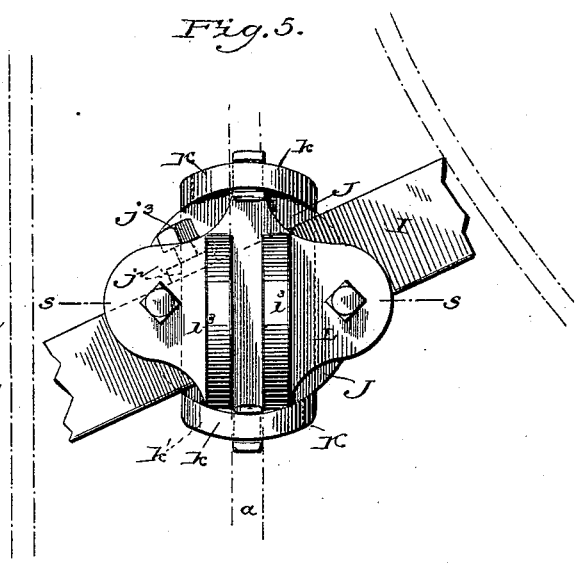
Figure 6:
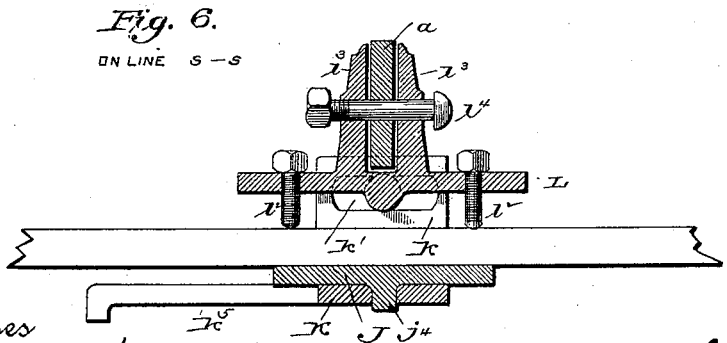

In the accompanying drawings, Figure 1 is a longitudinal vertical section of my seeder on the line $y\ y$ of Fig. 2. Fig. 2 is a transverse section on the line $x\ x$ of Fig. 1. Fig. 3 is a section on the line $z\ z$, Fig. 1. Fig. 4 is a side view of the clamping mechanism in position on the plow-brace. Fig. 5 is a plan view of the same. Fig. 6 is a vertical section on the line $s\ s$ of Fig. 5.

Referring to the drawings, A represents a tubular standard or seed-spout, preferably of curved form, provided at the lower end with a rigid forwardly-extending arm $a$, by which to connect it to the plow, and a rearwardly-extending rigid arm $a'$, having a journal $a^2$, to receive the wheel $a^3$, which in action travels in the furrow immediately behind the plow. This wheel and the arm $a$, connected to the plow by a clamp hereinafter described, serve to maintain the entire attachment in an upright position and in the proper relation to the plow. The standard or conductor is divided at the lower end into two distinct passages or spouts, the ends of which are separated, as shown, so that they may deliver the two rows of grain simultaneously and at the proper distance apart. The channels are merged at the upper end into the cylindrical portion; but the intermediate partition or division is continued nearly to the top, as shown in Fig. 2, so that seed delivered from opposite sides of the feed-wheel may be kept separate. To the upper end of the standard is firmly bolted a feed-cup B, in the form shown, its upper portion being expanded to form the bottom of a circular hopper or seed-box C, which is riveted thereto. The bottom of this hopper converges from the two sides, being adapted to receive a vertical circular feed-wheel D, having annular feed-grooves $d$ and $d'$, formed in its opposite sides. The cup closely encircles this wheel on the under side, and the wheel is covered on the upper side by a stationary rim or cap E. The rear portion of the seed-cup is adapted, as shown, to permit the free descent of the seed into the feed-wheel on opposite sides; but toward the forward side the cup is reduced in width and formed with vertical walls $b$, which fit closely against the sides of the wheel and which are provided with openings $b'$—one in each side—for the delivery of the seed from the respective sides of the wheel into the upper end of the conductor at its opposite sides. The passage of the seed downward from the hopper through the front of the wheel to the discharge-openings is prevented by ribs or lugs $b^3$, extending from the sides of the seed-cup into the respective channels of the wheel, as shown. The wheel is mounted upon and rotated continuously by a central shaft $E'$, bearing at its ends in the feed-cup and provided at one extremity with a driving-wheel F, pinned thereto. The wheel is rotated in the direction indicated by the arrow, and the seed passes in continuous streams downward at the rear side of the cup into the channels in the sides of the wheel, by which it is carried upward at the front and delivered in an outward direction through the openings $b'$, whence it descends into the conductor through its respective arms into the ground.

To regulate the rate of feed, I employ in each channel of the feed-wheel a gate G, mounted on a horizontal pivot $g$, extending outward through the side of the feed-cup. These pivots are located near the outer edges of the feed-wheel. The gate curves downward, as shown in Fig. 1, across the discharge-openings. It acts in connection with stationary studs $g'$ to control the flow of grain to the openings by partially covering the latter. The grain in its course through the channel of the wheel to the discharge-opening is compelled to pass beneath the downwardly-turned end of the gate. Consequently, as the gate rises and falls it changes the size of the seed-passage, and thus increases or diminishes the flow. The pivots of the two gates are connected at their outer ends to the respective arms of a U-shaped lever H, which spans a projecting lip $h$ on the feed-cup, and is secured in position by a screw $h'$ or similar locking device engaging the edge of said rib. The rib is preferably graduated on the side face, as shown, and the graduations suitably marked to indicate the rates of feed when the lever is brought in register with the respective graduations.

It will be observed that the movement of the lever adjusts the two gates simultaneously and equally. In order to permit the escape of dust and small impurities which are liable to lodge in the bottom of the feed-cup, I provide the latter with a narrow slot or opening $c^2$ of such size that while the escape of seed is prevented the dust is permitted to pass outward into the conductor. The conductor is preferably constructed in two parts meeting in a central longitudinal line, and united by rivets passing through ears in the respective parts, as indicated in the drawings; but it may be constructed in any other appropriate manner.

My attachment is intended to be secured to the horizontal brace which commonly connects the landside and the share of mold-board plows.

In order that the parts may be adapted to conform to braces varying in size and location and to maintain the apparatus in the required relation to the plow, I have devised a peculiarly-constructed adjustable clamp, to which the arm $a$ of the standard is connected by a horizontal pivot. The details of this clamp are plainly shown in Figs. 4, 5, and 6, in which I represents the plow-brace; J, a circular horizontal plate applied to the under side of the brace, having on its top a stud $j'$ to bear against one edge of the brace, and a second stud $j^2$, provided with a horizontal set-screw $j^3$, to act against the opposite edge of the brace. Thus constructed, the plate may be clamped firmly to the brace at any point in its length. On the under face the plate is provided with a central depending pivot-stud $j^4$ and with a series of peripheral serrations.

K is a second horizontal plate serrated on its upper face and applied to the under face of plate J to turn on the pivot $j^4$, its upper surface being serrated to interlock with the upper plate. At opposite edges this underlying plate K is provided with upright flanges $k$, having in their upper ends horizontal slots $k'$.

L is a third plate overlying the brace and provided with projecting trunnions $l$, which are passed through the slots in flanges $k$, so that the top plate may turn horizontally, and also rock or tip upon its journals $l$. Vertical screws $l^2$ are passed through opposite sides of the top plate and bear on top of the brace. They serve not only as a means of tipping the plate L, but also of supporting the same, so that it will, through its journals $l$, hold the bottom plate K upward firmly against plate J.

The top plate L is provided with two upright ears $l^3$, between which the arm $a$ of the seeding device is inserted and secured by a horizontal pivot $l^4$. This pivot $l^4$ sustains the arm of the seeder and draws the latter forward. The ears $l^3$ and the pivot keep the arm $a$ from tipping sidewise, and thus maintain the entire seeding attachment in an upright position, allowing it, however, to rise and fall as the wheel follows the bottom of the furrow.

By adjusting the screws $l^2$, and thus tipping the plate and the ears $l^3$, the seeder may be maintained in its vertical position notwithstanding any inclination of the brace I from the horizontal.

By loosening both screws $l^2$ the plate K may be lowered out of contact with plate J, and thus unlocked, so that it may be turned horizontally in order to align the arm $a$ and the seeding device with the furrow regardless of the horizontal angle or inclination of the brace I. Thus it will be seen the universal adjustment is provided, allowing the seeder to be maintained in the required relation to the plow without regard to the peculiar position of its brace.

As the brace is usually inclined rearward toward the landside the draft has a tendency to work the clamp toward the latter. I therefore prefer to provide the plate K with a horizontal arm $k^5$ to bear against the landside; but this is not a necessary feature.

Motion is communicated to the feed-wheel by a chain M, passing around the sprocket-wheel F and around a second sprocket-wheel $m$ on the hub of the furrow-wheel, as shown in the drawings. Other suitable connections may, however, be established between the two wheels, the driving-chain not being an essential feature of my construction.

Having thus described my invention, what I claim is—

1. In a seeding attachment for plows, the upright tubular conductor forked at the lower end and having the rigid front and rear arms, the furrow-wheel mounted on the rear arm, a clamp pivoted to the front arm, the hopper, the feed-wheel having duplicate channels in opposite faces, and suitable connecting-gearing between said wheel and the furrow-wheel, said elements combined substantially as and for the purpose described.

2. In a seeding attachment for plows, the vertical feed-wheel having duplicate channels in opposite faces and its supporting-shaft, in combination with the seed-cup formed, as described, to permit the passage of the seed to the sides of the wheel at the rear but contracted at the front and provided with delivery-openings in both sides, the forked tubular conductor having a central partition and bolted to the seed-cup, a supporting-wheel, and an arm for connection with the plow.

3. The vertical feed-wheel having duplicate channels in its faces, in combination with the seed-cup having the laterally-expanded front portion, the contracted rear portion fitting the sides of the wheel, the studs $b^3$ and $g'$, the outlet-openings between said studs, the regulating-gates located between said openings and the studs $g'$, the forked lever attached to the plates, and the bridge overlying the wheel.

4. In combination with a seed-distributing mechanism substantially such as described, the supporting-clamp pivoted thereto, said clamp comprising a plate with clamping devices thereon, an underlying plate pivoted thereto and provided with slotted ears, and a top plate having vertical screws and horizontal trunnions extended through the slots of the bottom plate.

5. In a clamp for connecting a seeding attachment to the cross-brace of a mold-board plow, the plate provided with studs and a fastening-screw for connecting it with the brace, in combination with the underlying plate pivoted thereto and provided with upright slotted ears, and the top plate provided with vertical screws, and with trunnions extending through the slotted ears.

In testimony whereof I hereunto set my hand, this 21st day of February, 1889, in the presence of two attesting witnesses.

WILLIAM D. LINDSLEY.

Witnesses:
J. J. CAMPBELL,
J. S. COLE.